United States Patent [19]

Ishido et al.

[11] Patent Number: 4,917,444
[45] Date of Patent: Apr. 17, 1990

[54] ANTILOCK BRAKE CONTROL METHOD AND SYSTEM FOR MOTOR VEHICLES

[75] Inventors: Hideki Ishido; Takayuki Ushijima; Katsumasa Igarashi; Seiichi Ishizeki, all of Tokyo, Japan

[73] Assignee: Fuji Jukogyo Kabushiki Kaisha, Tokyo, Japan

[21] Appl. No.: 309,369

[22] Filed: Feb. 13, 1989

[30] Foreign Application Priority Data

Feb. 16, 1988 [JP] Japan ................... 63-33038

[51] Int. Cl.$^4$ .............................. B60T 8/74
[52] U.S. Cl. .................... 303/100; 303/962; 303/91; 188/112 A
[58] Field of Search ............ 303/100, 9.89, 9.63, 303/113, 91, 9.62; 188/112 A

[56] References Cited

U.S. PATENT DOCUMENTS

| 3,797,892 | 3/1974 | Leiber | 303/100 X |
| 3,910,647 | 10/1975 | Takeuchi | 303/100 |
| 3,933,362 | 11/1976 | Kamins et al. | 188/112 AV |
| 3,966,264 | 6/1976 | Mattori et al. | 303/110 X |
| 4,647,115 | 3/1987 | Leiber et al. | 303/100 X |
| 4,758,053 | 7/1988 | Yasuno | 303/91 |
| 4,809,181 | 2/1989 | Ito et al. | 303/100 X |

FOREIGN PATENT DOCUMENTS 60-61354 4/1985 Japan .

Primary Examiner—Andres Kashnikow
Assistant Examiner—Matthew C. Graham
Attorney, Agent, or Firm—Beveridge, DeGrandi & Weilacher

[57] ABSTRACT

An antilock brake control for motor vehicles, wherein the actual wheel speed of each wheel of the vehicle is detected, and in dependency on the detected wheel speed, a reference vehicle speed is computed from which a reference wheel speed lower than the vehicle speed is determined, and wherein when the actual wheel speed decreases below the reference wheel speed as a result of braking operation, the braking hydraulic pressure acting on the wheel is decreased to allow the actual wheel speed to increase, and then the braking hydraulic pressure is reincreased when the actual wheel speed has recovered sufficiently. When a J-turn state of the vehicle is detected by lateral acceleration, the reference vehicle speed is changed to a lower value and a second reference wheel speed is determined on the basis of that lower value. The control of the braking operation is thus carried out in dependency on the second reference wheel speed shifted to a lower level, whereby the time when the braking hydraulic pressure is increased is advanced, and the time length during which the braking hydraulic pressure is decreased is shortened so that effective braking operation is carried out in the J-turn state.

7 Claims, 4 Drawing Sheets

ANTILOCK BRAKE CONTROL METHOD AND SYSTEM FOR MOTOR VEHICLES

BACKGROUND OF THE INVENTION

The present invention relates to an antilock brake control method and system for motor vehicles.

In prior art hydraulic braking system for motor vehicles, there have been proposed and demonstrated various types of antilock brake control devices in which when the brakes are applied to cause the braking hydraulic pressure to be supplied to the brake device for each wheel and the hydraulic pressure in the brake device is increased, the hydraulic pressure in the brake device is decreased in response to drop of the wheel speed, and in which the hydraulic pressure is increased again after recovery of the wheel speed due to the decrease in hydraulic pressure in the brake device, and the same control pattern is repeated whereby effective braking operation can be accomplished. Such a type of antilock brake control device is disclosed in Japanese Patent Application Laid-Open Publication (Kokai) No. 60-61354 published Apr. 9, 1985.

In the case of conventional antilock brake devices of the type described above, control is carried out for decreasing and reincreasing the braking hydraulic pressure in response to wheel-speed signals delivered from wheel speed sensors provided for respective wheels. In practice, the hydraulic brake line system is formed as a dual brake line system in which two pairs of diagonally opposing wheels are connected to two independent brake lines, respectively, so that even in case of failure of one brake line, an emergency braking force can be produced by the other brake line. Generally, in this case, the lower wheel speed of the speeds of the two wheels connected to the same brake line is selected, and in response to the selected lower wheel speed, the braking hydraulic pressure control in that brake line is carried out so that all the wheels are prevented from locking.

However, in the case of a J-turn (which is a well known state when a vehicle enters a curve at a speed exceeding a predetermined value and the driver makes a sharp turn), there occurs the following phenomenon. That is, when the antilock brake device operates in the manner described above, the difference in wheel speed between the inner and outer wheels becomes large and lateral acceleration is produced so that the inner wheels tend to rise up and the reaction forces from the surface of the road acting on the inner wheels are consequently decreased. As a result, the wheel speeds of the inner wheels are considerably decreased when compared with the wheel speeds of the outer wheels, and consequently the control for decreasing and increasing the braking hydraulic pressure is carried out mainly on the basis of the wheel speeds of the inner wheels. Then, since the reaction forces from the surface of the road acting on the inner wheels are low as described above, the wheel speeds are abruptly decreased in response to a slight increase in the hydraulic pressure, and consequently the wheels are brought to a state in which the wheels are almost locked. Even when the hydraulic pressure is decreased under such conditions, it takes a long time for the wheel speeds to recover, and the "no braking" mode (the state in which the hydraulic pressure is decreased) becomes longer. As a consequence, the braking force becomes insufficient as a whole, so that there arises the problem that the distance through which the vehicle travels after braking becomes longer than expected in an extremely dangerous state in which the brakes are abruptly applied in the J-turn state, which seriously inhibits the safety drive.

SUMMARY OF THE INVENTION

The primary object of the present invention is therefore to substantially solve the above and other problems encountered in the conventional antilock brake control.

To the above and other objects, the present invention is characterized in that when the brakes are suddenly applied in a J-turn state, the vehicle speed, which is a reference based upon which the points at which the braking hydraulic pressure is decreased and reincreased, respectively, are determined, is switched to a lower level than the vehicle speed in the normal driving mode, so that a reference wheel speed is established on the basis of the vehicle speed in J-turn state, to thereby carry out the control for decreasing the hydraulic pressure and reincreasing it.

As described above, when brakes are suddenly applied in a J-turn state, a vehicle speed for the J-turn state lower than the vehicle speed in the normal driving mode is selected so that the reference wheel speed is necessarily decreased to a level which is considerably lower than the reference wheel speed in the normal driving mode. As a result, the time when the hydraulic pressure is decreased is delayed, and even when the recovery of the wheel speed is not sufficient, the wheel speed can reach the reference wheel speed even at a relatively low recovery rate so that the time when the hydraulic pressure is reincreased is advanced. Consequently, the time interval during which the hydraulic pressure is decreased is shortened; the effectiveness of braking operation is improved; and the braking distance is considerably shortened.

DETAILED DESCRIPTION OF THE PREFERRED EMBODIMENTS

Preferred embodiments of the present invention will now be described i detail hereinafter with reference to the accompanying drawings.

Figure 1:
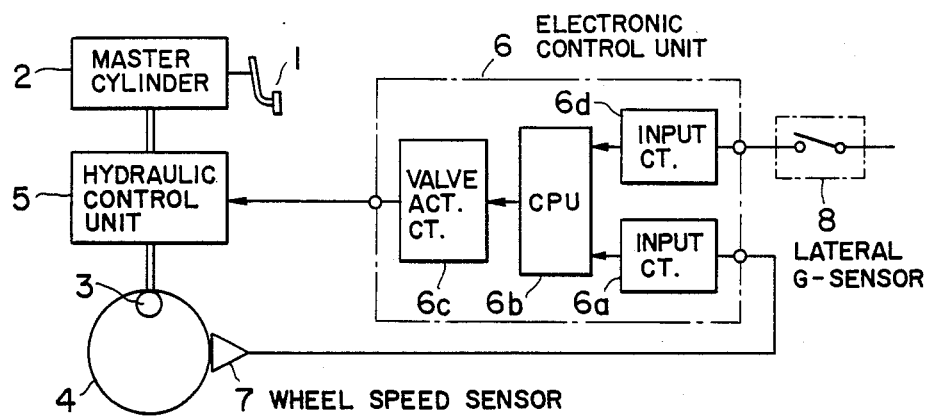
FIG. 1 is a schematic view illustrating a preferred embodiment of antilock brake control system in accordance with the present invention.
Figure 2:
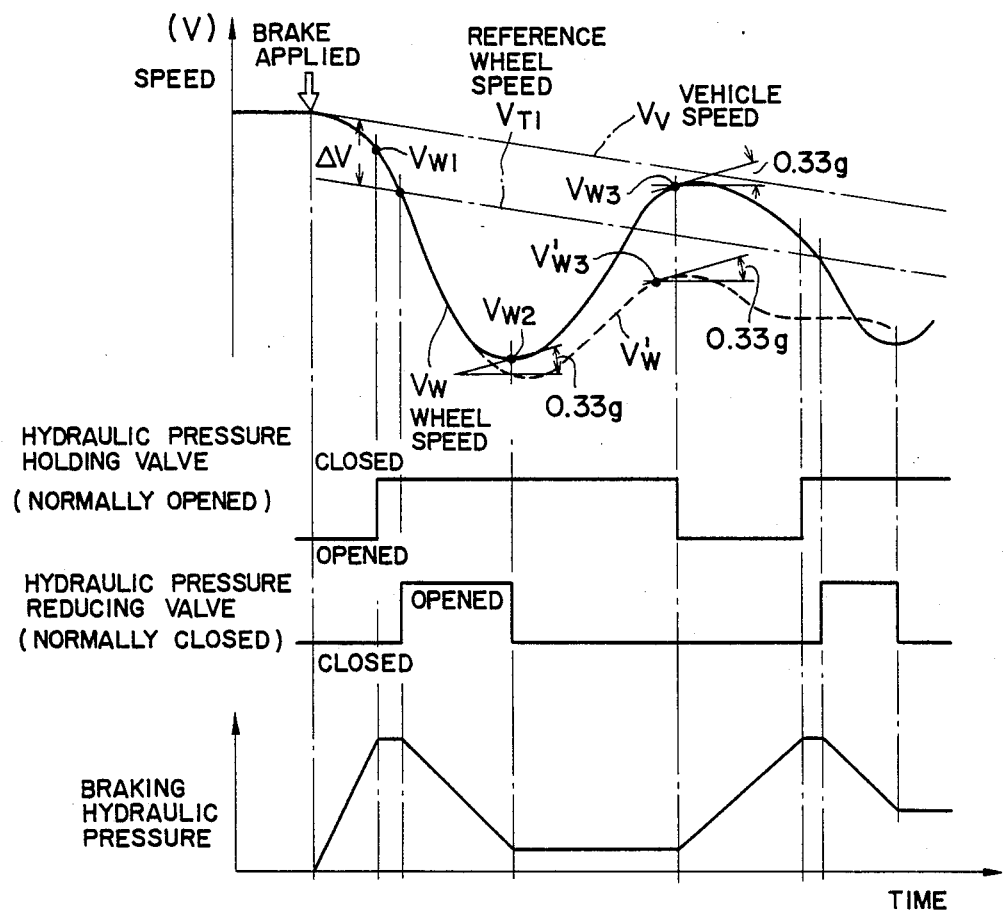
FIG. 2 is a graph explanatory of the mode of the braking hydraulic pressure control during antilock brake control operation in normal traveling condition.
Figure 8:
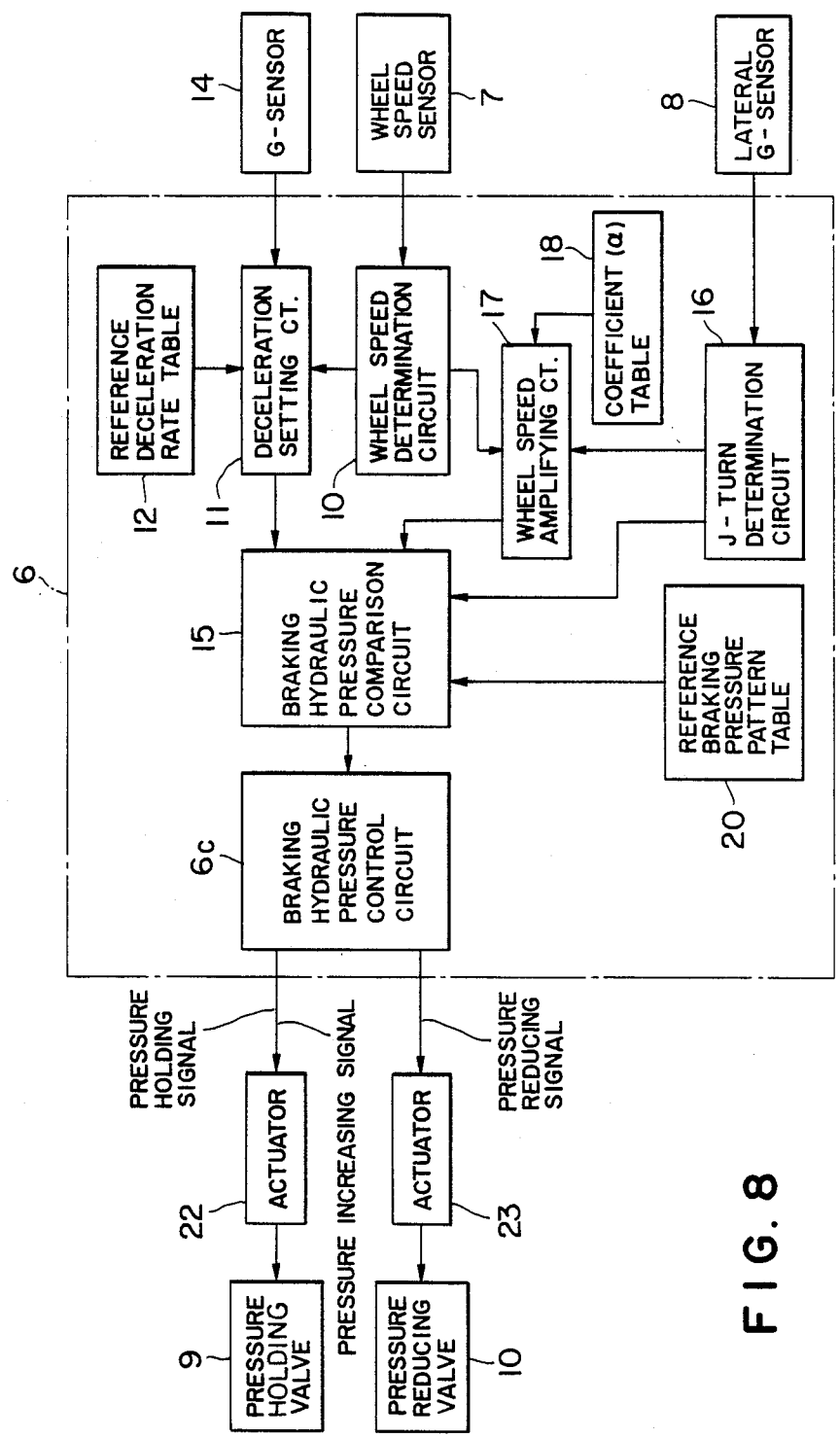
FIG. 8 is a schematic block diagram of the antilock brake system.

FIG. 1 illustrates an example of antilock brake devices to which the present invention is applied. Reference numeral 1 designates a brake pedal operatively connected to a master cylinder 2; and 3, a brake device for a wheel 4. Interposed between the master cylinder 2 and the brake device 3 is a hydraulic control unit (to be referred to as "HU" hereinafter in this specification) 5. As shown in FIG. 8, the HU 5 comprises a known hydraulic pressure holding valve 9 for interrupting the supply of hydraulic pressure through the brake line from the master cylinder 2 to the brake device 3, a known pressure reducing valve 10 adapted to open for relieving the hydraulic pressure in the brake device 3 into a reservoir during the time when the hydraulic pressure holding valve 9 is closed, and a pump (not shown) for providing the brake fluid flowing into the reservoir and supplying it through an accumulator (not shown) to the brake line upstream of the pressure holding valve 9. In response to the wheel speed signal from a wheel speed sensor 7 which detects the wheel speed of the wheel 4, a pulse input circuit 6a (FIG. 1) of an electronic control unit (to be referred to as "ECU" hereinafter in this specification) 6 operates to produce a signal to a central processing unit 6b of the ECU 6, and the central processing unit 6b produces a command signal to a valve actuating circuit 6c of the ECU 6, whereby the circuit 6c generates signals for controlling the pressure holding valve 9, the pressure reducing valve 10 and the pump in the HU 5, respectively, so that the braking hydraulic pressure control is carried out, for instance, in the manner as shown in FIG. 2.

That is, normally the pressure holding valve 9 is kept opened while the pressure reducing valve 10 remains closed. When the brake pedal 1 is depressed to activate the master cylinder 2, braking hydraulic pressure is transmitted through the hydraulic pressure holding valve 9 to the brake device 3 so that the hydraulic pressure in the brake device 3 rises. With the increase in hydraulic pressure in the brake device 3, the braking force is produced so that the speed Vw of the wheel 4 is decreased. When the rate of decrease in the hydraulic pressure reaches a predetermined value (for instance, 1.1 g) $V_{w1}$, the ECU 6 generates the holding signal so that the hydraulic pressure holding valve 9 is closed whereby the supply of the hydraulic pressure from the master cylinder 2 is shut off and the hydraulic pressure in the brake device 3 is maintained at the same value as that when the supply of the hydraulic pressure is shut off.

While the hydraulic pressure in the brake device 3 is maintained at the same pressure as described above, when the wheel speed Vw is further decreased to a predetermined value $V_{T1}$ (to be described below), the ECU 6 generates a signal in response to which the pressure reducing valve 10 is opened, so that the brake fluid in the brake device 3 flows into the reservoir and the hydraulic pressure in the brake device 3 is consequently decreased.

The brake fluid which flows into the reservoir is stored into the accumulator by the pump.

When the hydraulic pressure in the brake device 3 is decreased in the manner described above, the wheel speed Vw of the wheel 4 increases from the minimum point due to the reaction force from the surface of the road, and when the rate of increase of the wheel speed increases to exceed a predetermined value $V_{w2}$ (for instance, 0.33 g), the pressure reducing valve 10 is closed, and the hydraulic pressure in the brake device 3 is maintained at a constant value. Since the reaction force from the surface of the road is higher than the braking force, the wheel speed Vw recovers and the rate of increase and decreases gradually as it approaches the vehicle speed Vv. When the rate of increase drops to a point $V_{w3}$ where the rate is below a predetermined value (for instance, 0.33 g), it is determined that the wheel speed Vw is sufficiently recovered so that the hydraulic pressure holding valve 9 is opened and the brake fluid supplied by the pump flows through the hydraulic pressure holding valve into the brake device 3. As a result, the hydraulic pressure in the brake device 3 is increased whereby the wheel speed Vw decreases again. Thereafter, the control for sequentially decreasing the pressure and then increasing it again is repeated.

The wheel speed $V_{T1}$ at which the pressure reducing valve opens, is generally selected at a value that is lower than the vehicle speed Vv by $\Delta V$; that is, $V_{T1} = Vv - \Delta V$ and $\Delta V \approx Vv \times 0.1$. In other words, the wheel speed $V_{T1}$ is so selected that $V_{T1}$ can follow Vv, maintaining a value which is about 10% smaller than the vehicle speed Vv. In practice, the vehicle speed is, in general, divided into a plurality of vehicle speed ranges such as a low speed range, an intermediate speed range and a high speed range and, for instance, in the intermediate speed range from 40 to 60 Km/H, $\Delta V$ is set at a predetermined value of 5 Km/H, for instance.

In the above-described antilock brake control, when the braking hydraulic pressure is decreased, the recovery of the wheel speed Vw is made by the reaction force from the surface of the road. When the coefficient of friction of the surface of the road is low, the reaction force from the surface of the road is also low so that the recovery of the wheel speed is considerably slow. As a result, the wheel speed becomes unstable with a large slip rate as indicated by the broken line Vw' as shown in FIG. 2.

In this case, when the pressure is increased at the point $V_{w3}'$ at which the rate of increase of the wheel speed is less than the predetermined value 0.33 g, the wheel 4 locks, immediately causing skid. Therefore, when the point at which the rate of increase becomes lower than the predetermined value 0.33 g is lower than $V_{T1}$, it is not determined that the wheel speed has not recovered sufficiently so that the braking hydraulic pressure is not increased and is maintained at a certain constant value.

It follows that when the wheel speed Vw is within the range in excess of $V_{T1}$ and furthermore, when the rate of increase becomes lower than the predetermined value 0.33 g, the ECU 6 generates a signal in response to which the hydraulic pressure holding valve 9 opens so that the pressure increases. Thus, $V_{T1}$ is a reference wheel speed that is a wheel-speed-recovery threshold value at which it is determined that the wheel speed has recovered sufficiently and that represents a predetermined speed allowing the opening of the pressure reducing valve 10.

It is to be noted here that the vehicle speed Vv is approximately computed from the highest wheel speed of the speeds of the four front and rear wheels.

Figure 6:
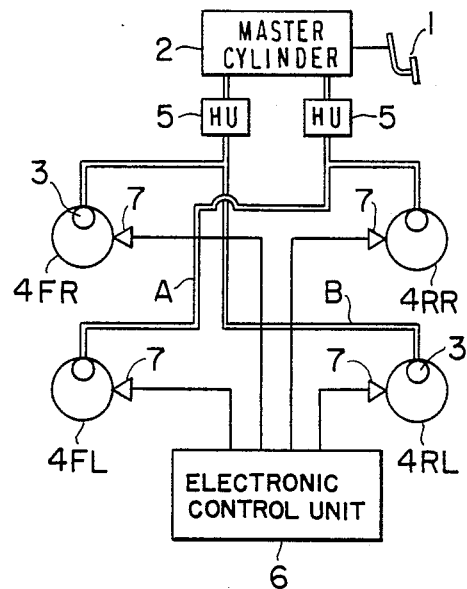
FIG. 6 is a diagrammatic view showing a brake line system.
Figure 7:
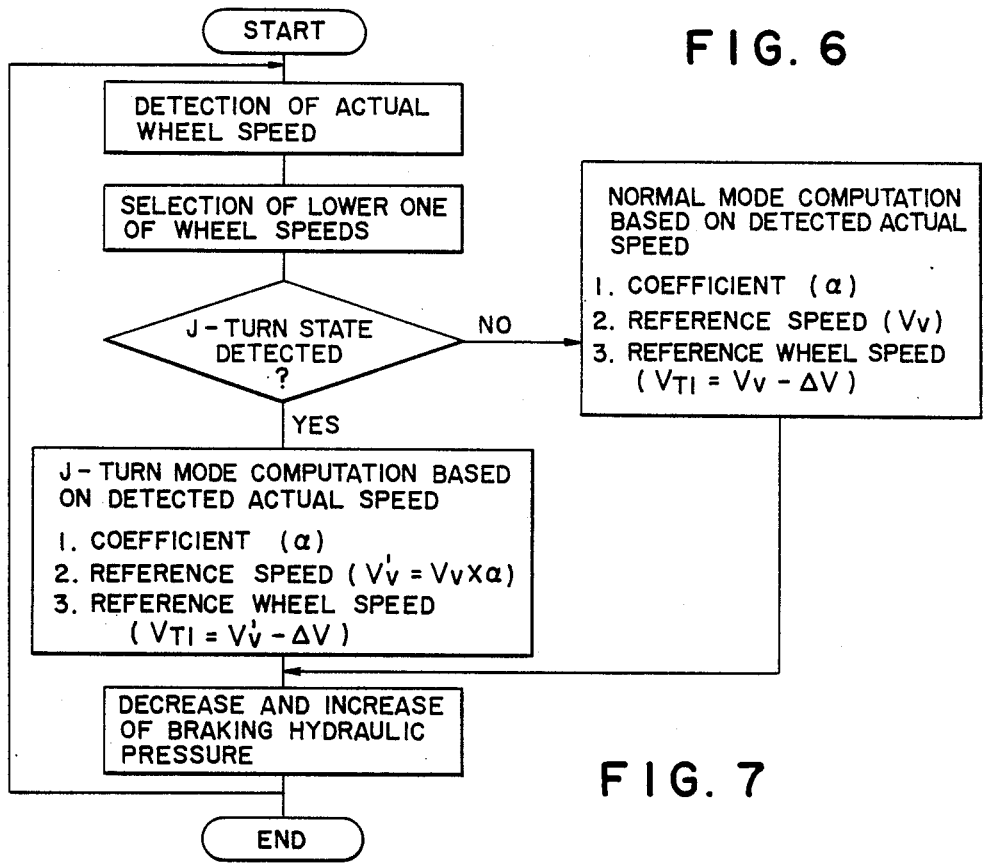
FIG. 7 is a flow chart showing the antilock brake control.

FIG. 1 illustrates only the antilock brake control system for one of the four wheels, but in practice, a dual brake line system is employed as shown in FIG. 6. For instance, the brake devices 3 of the left front wheel 4FL and the right rear wheel 4RR are connected by one brake line A with the master cylinder 2, while the brake devices 3 of the right front and left rear wheels 4FR and 4RL are connected through the other brake line B to the master cylinder 2. One HU 5 is inserted into each of the two brake lines A and B, and the braking hydraulic pressure control is carried out in common for the two wheels in the same brake line. The ECU 6 selects the lower wheel speed of the wheel speeds of the two wheels connected to the same brake line. On the basis of the selected lower wheel speed and the vehicle speed, the ECU 6 determines the timing for controlling the decrease or increase in pressure in the brake devices 3 of the two wheels connected to the same brake line and delivers the signals to the HU 5 in the same brake line. Thus, antilock brake operation which never results in locking of the wheels can be ensured.

However, when the antilock brake control carried out in the normal running condition (that is, in the normal state) in the manner described above, is applied during the braking operation in case of a J-turn, the antilock brake control is adversely affected to a considerable degree.

Figure 4:
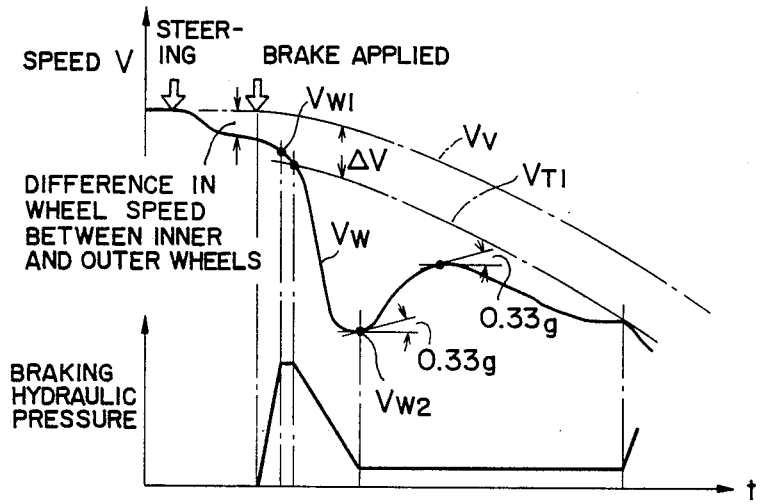
FIG. 4 is a view explanatory of the mode of antilock brake control in the J-turn state by utilizing the antilock brake control carried out in the normal traveling mode, the view illustrating a conventional antilock brake control method.

That is, in the so-called J-turn state in which the driver makes a sharp turn when the motor vehicle enters a curve at a wheel speed exceeding a predetermined value, the difference in wheel speed between the inner and outer wheels becomes greater due to the difference in locus of path between the inner and outer wheels. Furthermore, due to the displacement of the load toward the outer wheels, the inner wheels tend to rise up from the surface of the road so that the reaction forces from the surface of the road acting on the inner wheels are considerably decreased. During such a J-turn state, when the brakes are abruptly applied and the antilock brake operation is commenced, the error of the vehicle speed Vv which is computed from the highest wheel speed becomes large. Furthermore, as shown in FIG. 4, due to the decrease in reaction force from the surface of the road acting on the inner wheels, the speeds of the inner wheels are more quickly decreased than the wheel speeds of the outer wheels during braking, and the decrease in pressure is carried out at a relatively low braking hydraulic pressure. Moreover, the recovery of the wheel speed is adversely affected to an extreme degree to becomes unstable at a level lower than the reference wheel speed $V_{T1}$. The speed $V_{T1}$ is not only the threshold value which determines the point at which the pressure is decreased but also the threshold value for the wheel speed recovery. As a result, the length of time until the pressure is increased again; that is, the time length during which the pressure is maintained decreased becomes longer to adversely affect the braking operation so that the distance through which the vehicle travels after braking becomes longer accordingly.

In view of the above problems, according to the present invention, the ECU 6 has a J-turn detecting means for determining whether the motor vehicle is in the J-turn state. When the motor vehicle is in the J-turn state, the method of computing the vehicle speed Vv on the basis of which the reference wheel speed is determined, is changed, and the vehicle speed is offset to a value lower than the normal value. The reference wheel speed is determined to have a value which is lower by ΔV than the lowered vehicle speed, and the control for the decrease and reincrease in pressure is carried out on the basis of the reference wheel speed. As a result, the time when the pressure is decreased is delayed, and the time when the pressure is reincreased is advanced, so that as a whole the length of time of pressure decrease is decreased while the length of time during which the pressure is reincreased becomes longer, whereby braking operation becomes effective and the distance through which the vehicle travels after braking can therefore be shortened.

Figure 3:
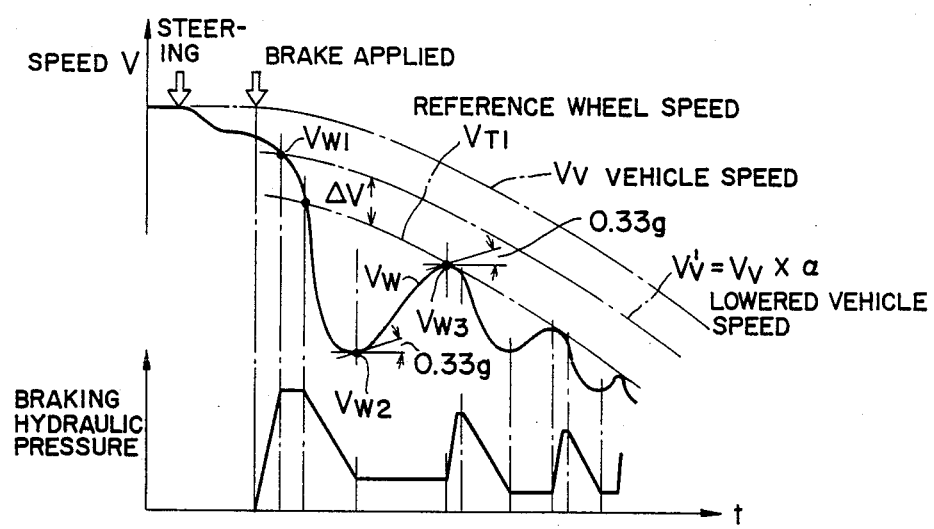
FIG. 3 illustrates the mode of braking hydraulic pressure control during antilock brake control operation when the motor vehicle is in a J-turn state.

In one embodiment of the present invention, as shown in FIG. 1, a lateral G-sensor 8 for detecting the acceleration in the lateral direction of the vehicle body is provided. The lateral G-sensor 8 is, for example, in the form of an electric switch which is closed when the vehicle receives lateral acceleration larger than a predetermined value as a result of the J-turn. The lateral G-sensor 8 is connected to an input circuit 6d of the ECU 6, and, in response to the magnitude of the lateral acceleration detected by the lateral G-sensor 8 (or the magnitude of a combined value of lateral acceleration and the vehicle speed Vv computed from the wheel speed), it is determined by the central processing unit 6b whether or not the motor vehicle is in J-turn state. When the vehicle is determined to be in the J-turn state, a method is used for determining the vehicle speed Vv' (FIG. 3) of the vehicle to be referenced in the J-turn state by multiplying the vehicle speed Vv by a certain coefficient α ($1 > α > 0$) in the normal state obtained by computation of the higher wheel speed. This operation is carried out by the central processing unit 6b.

Figure 5:
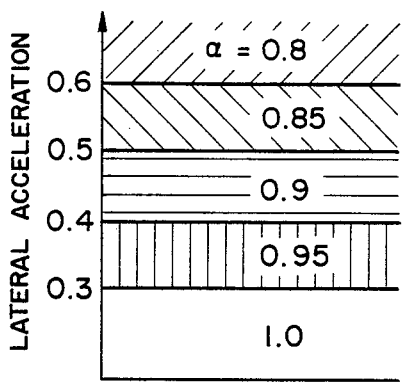
FIG. 5 illustrates a relationship between lateral acceleration and coefficients when one of the coefficients is multiplied by the motor vehicle speed in the normal traveling mode to determine a vehicle speed in J-turn state.

The coefficient α varies in dependency on the magnitude of the lateral acceleration g as shown in FIG. 5. It is so determined that the higher the lateral acceleration g, the smaller the coefficient α becomes.

When the vehicle is in J-turn state, the vehicle speed Vv' is equal to Vv×α ($1 > α > 0$) so that when the brake are abruptly applied in the J-turn state, the reference wheel speed $V_{T1}$ drops to a level considerably lower than the level $V_{T1}$ in the case of normal mode shown in FIG. 4. The reference wheel speed $V_{T1}$ is a value lower than the vehicle speed Vv' for J-turn state by ΔV (for instance, 5 Km/H in the intermediate speed range as described above) as shown in FIG. 3. As a result, the point at which the hydraulic pressure is decreased is delayed in comparison with the case of the normal mode, and even when the recovery of the wheel speed is insufficient, the wheel speed reaches the reference wheel speed $V_{T1}$ at a relatively low recovery rate whereby the pressure can be increased again. Furthermore, the time length during which the pressure is decreased is considerably shortened; the effectiveness of the braking operation is improved; and the distance through which the vehicle travels after braking is shortened.

The method of determining whether the vehicle is in the J-turn state is not limited to the above-described embodiment, and whether or not the vehicle is in J-turn state can be determined based on lateral acceleration computable on the basis of the steering or turning angle and the vehicle speed (for instance, the vehicle speed Vv), or on the basis of the difference in wheel speed between the right and left wheels diagonally opposite each other.

It is to be further understood that the method for computing the vehicle speed in the J-turn state is not limited to the above-described embodiment and that, for instance, a method may be employed in which a certain value β is subtracted from the vehicle speed Vv' in the normal mode so as to determine the vehicle speed Vv' for the J-turn state, the value β being varied depending upon the magnitude of the lateral acceleration. Alternatively, a method may be employed in which the vehicle speed Vv for normal mode is determined by the computation of the highest wheel speed among the four wheels in the manner described above, while the vehicle speed for the J-turn state is determined by the computation of the second highest wheel speed so that the vehicle speed Vv' lower than Vv is determined.

FIG. 8 illustrates in detail an example of the ECU 6. The wheel speed signal is provided from the wheel speed sensor 7 to a wheel speed determination circuit 10. The circuit 10 delivers its output to a deceleration setting circuit 11, in which the wheel speed is compared with a reference deceleration rate table 12 and the rate of deceleration is set. A G-sensor 14 which detects acceleration in the front-to-rear direction of the vehicle delivers its output to the circuit 11. The output of the deceleration setting circuit 11 is provided to a braking hydraulic pressure comparison circuit 15.

The lateral G-sensor 8 is connected to a J-turn determination circuit 16. When it is determined that there is a J-turn state, the J-turn determination circuit 16 puts out a signal to the braking hydraulic pressure comparison circuit 15. The circuit 16 also puts out a signal to a wheel speed amplifying circuit 17, to which is also provided a wheel speed signal from the wheel speed determination circuit 10. The wheel speed signal inputted to the amplifying circuit 17 is multiplied by a coefficient α from a coefficient table 18 and is supplied to the braking hydraulic pressure comparison circuit 15. The value of α is varied as indicated in FIG. 5 depending upon the magnitude of the lateral acceleration signal supplied from the J-turn determination circuit 16.

The input signals to the comparison circuit 15 from the deceleration setting circuit 11 and so on are compared with a reference braking pressure pattern table 20, and resulting output signal is inputted to the braking hydraulic pressure control circuit 6c. Thereafter, the circuit 6c controls the hydraulic pressure via actuators 22 and 23.

As described above, according to the present invention, when the brakes are abruptly applied in the J-turn state, the control is carried out in such a way that the vehicle speed obtained on the basis of computation of the higher wheel speed is switched to a vehicle speed for the J-turn state which is lower than the first-mentioned vehicle speed. As a result, the time when the braking hydraulic pressure is decreased is delayed while the time when the pressure is reincreased is advanced so that the effectiveness of the braking operation as a whole can be improved and the distance through which the vehicle travels after braking can be considerably shortened. Therefore, the present invention can attain one of the greatest advantageous effects of considerably improving and ensuring driving safety even in the extremely dangerous condition where the brakes are abruptly applied when the vehicle is in the J-turn state.

What is claimed is:

1. In an antilock brake control method for a motor vehicle with an antilock brake responsive to braking hydraulic pressure and a wheel speed sensor provided to detect wheel speed, comprising the steps of:

detecting an actual wheel speed responsive to output signal of said wheel speed sensor;

setting a first reference vehicle speed responsive to said actual wheel speed;

determining a first reference wheel speed responsive to said first reference vehicle speed;

decreasing said braking hydraulic pressure when the actual wheel speed falls below said first reference wheel speed;

reincreasing said decreased braking hydraulic pressure when the actual wheel speed exceeds said first reference wheel speed; and detecting a lateral acceleration responsive to lateral movement of the vehicle;

the improvement comprising:

determining a J-turn state of the vehicle when said lateral acceleration is in excess of a predetermined value;

determining a second reference wheel speed representing a value lower than said first reference wheel speed at said J-turn state; and controlling the braking hydraulic pressure in dependency on the second reference wheel speed at said J-turn state, so as to delay timing of decreasing the braking hydraulic pressure and to advance timing of reincreasing the braking hydraulic pressure.

2. The method as set forth in claim 1, further comprising the steps of:

calculating a second reference vehicle speed with a coefficient and said first reference vehicle speed; and setting said second reference wheel speed representing a value lower than said second vehicle speed at said J-turn state.

3. The method as set forth in claim 2, further comprising the steps of:

determining said coefficient relating with said lateral acceleration at said J-turn state.

4. The method as set forth in claim 1, further comprising the steps of:

determining said second reference wheel speed in dependency on subtracting from the first reference vehicle speed a value representing a function increasing with said detected lateral acceleration at said J-turn state.

5. The method as set forth in claim 1, further comprising the steps of:

setting said first reference vehicle speed to a highest actual wheel speed among the detected actual wheel speeds; and setting said second reference wheel speed to a second highest actual wheel speed among the detected wheel speeds at said J-turn state.

6. The method as set forth in claim 1, further comprising the steps of:

sensing a steering angle and a vehicle speed; and computing the lateral acceleration on the basis of the steering angle and the vehicle speed.

7. In an antilock brake control system for a motor vehicle with an antilock brake responsive to braking hydraulic pressure, having:

wheel speed sensing means for sensing an actual wheel speed;

electronic control means responsive to the actual wheel speed for setting a first reference vehicle speed and determining a first reference wheel speed lower than the first reference vehicle speed; and lateral acceleration sensing means for sensing a lateral acceleration responsive to lateral movement of the vehicle;

the improvement of the system, wherein said electronic control means comprises:

J-turn determining means for determining a J-turn state of the vehicle when the lateral acceleration is in excess of a predetermined value;

means for determining a second reference wheel speed lower than said first reference wheel speed at said J-turn state; and means for controlling the braking hydraulic pressure in dependency on the second reference wheel speed at said J-turn, so as to delay timing of decreasing the braking hydraulic pressure and to advance timing of reincreasing the braking hydraulic pressure.

* * * * *